Figure 1:
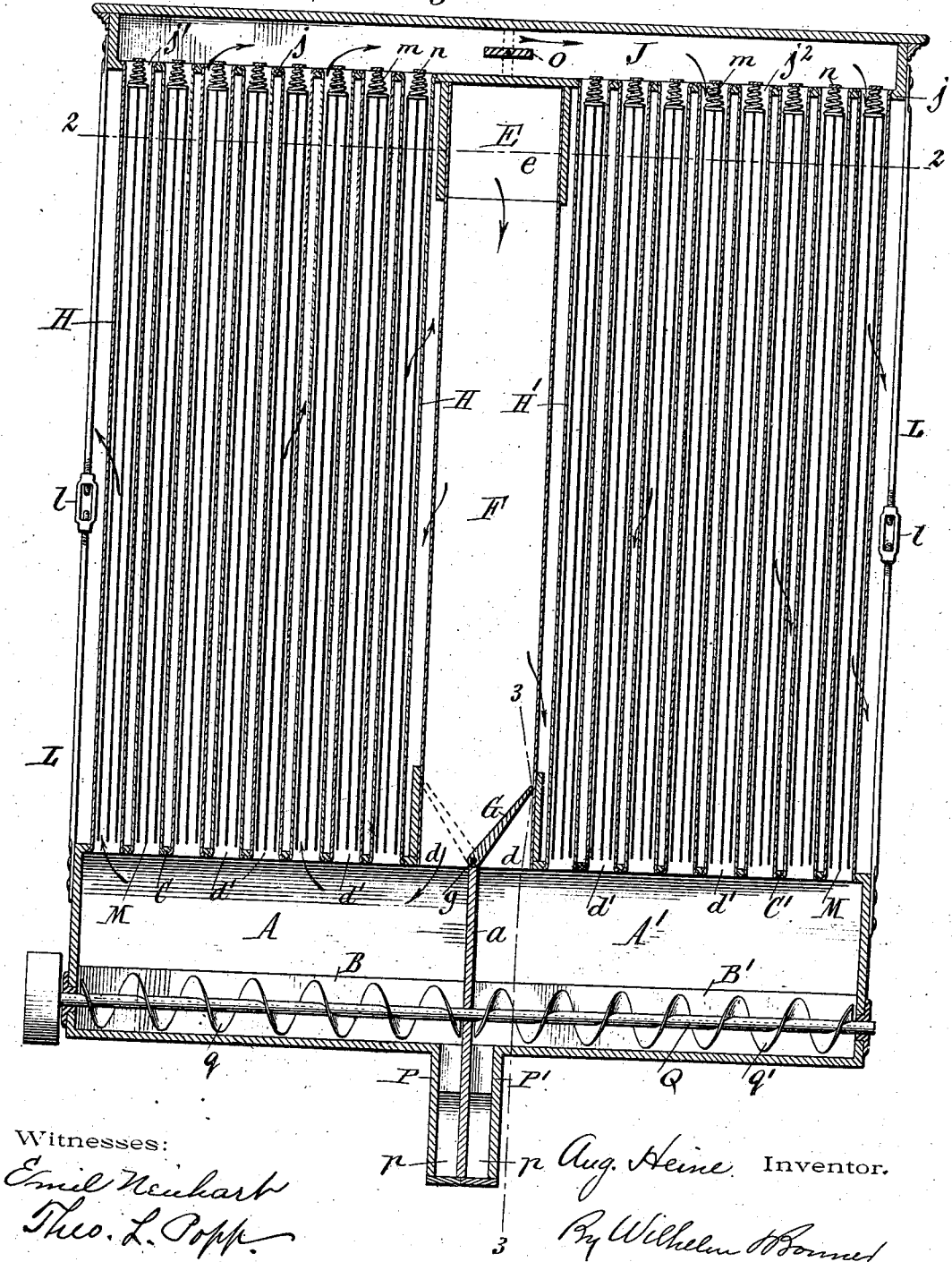

(No Model.)

A. HEINE.
DUST COLLECTOR.

No. 523,652.  3 Sheets—Sheet 1.

Patented July 24, 1894.

Witnesses:
Emil Neuhart
Theo. L. Popp

Aug. Heine Inventor.
By Wilhelm Bonner
Attorneys.

(No Model.)
A. HEINE.
DUST COLLECTOR.
No. 523,652.  Patented July 24, 1894.
3 Sheets—Sheet 2.
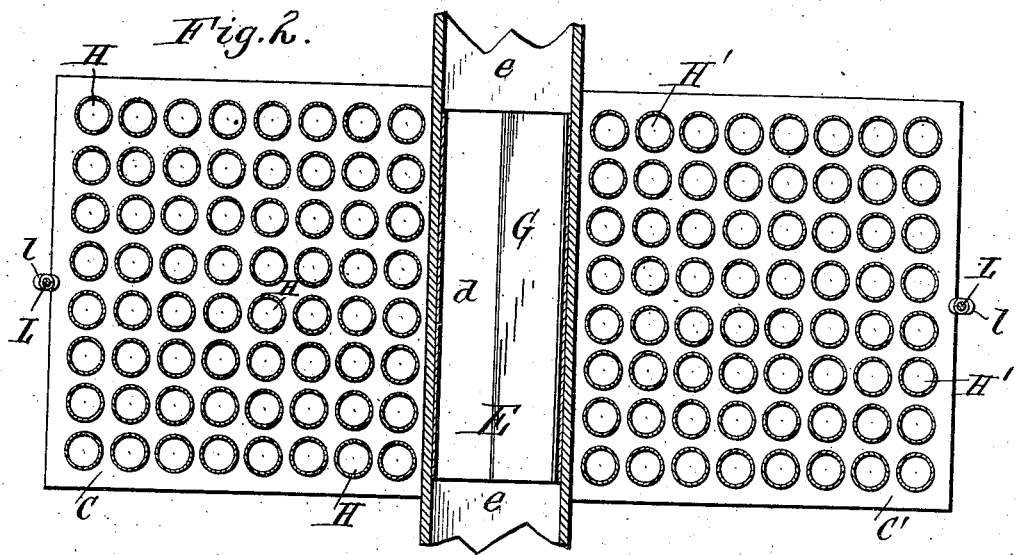
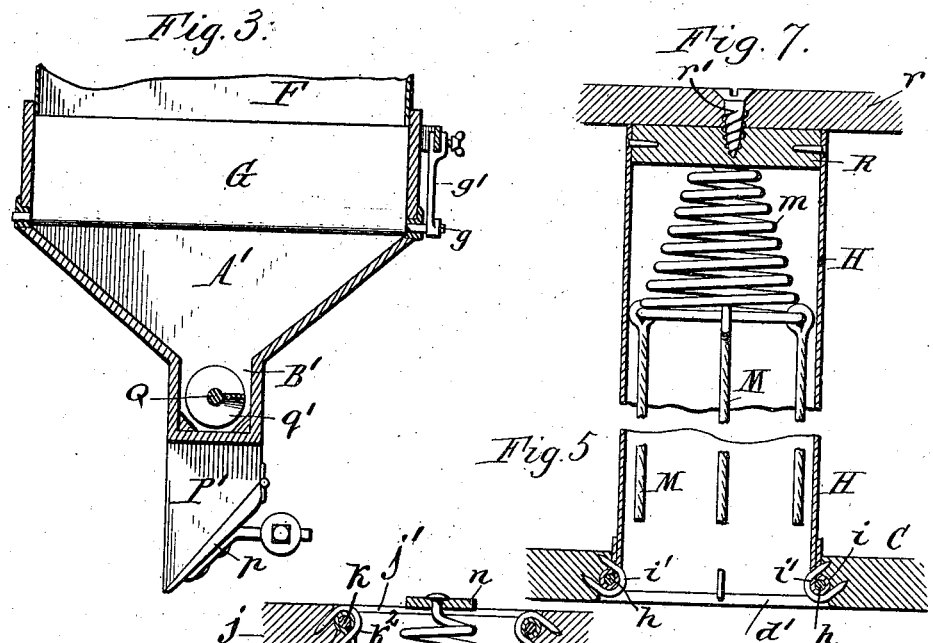
Witnesses:
Emil Neuhart
Theo. L. Popp
Aug. Heine Inventor.
By Wilhelm Bonner
Attorneys.

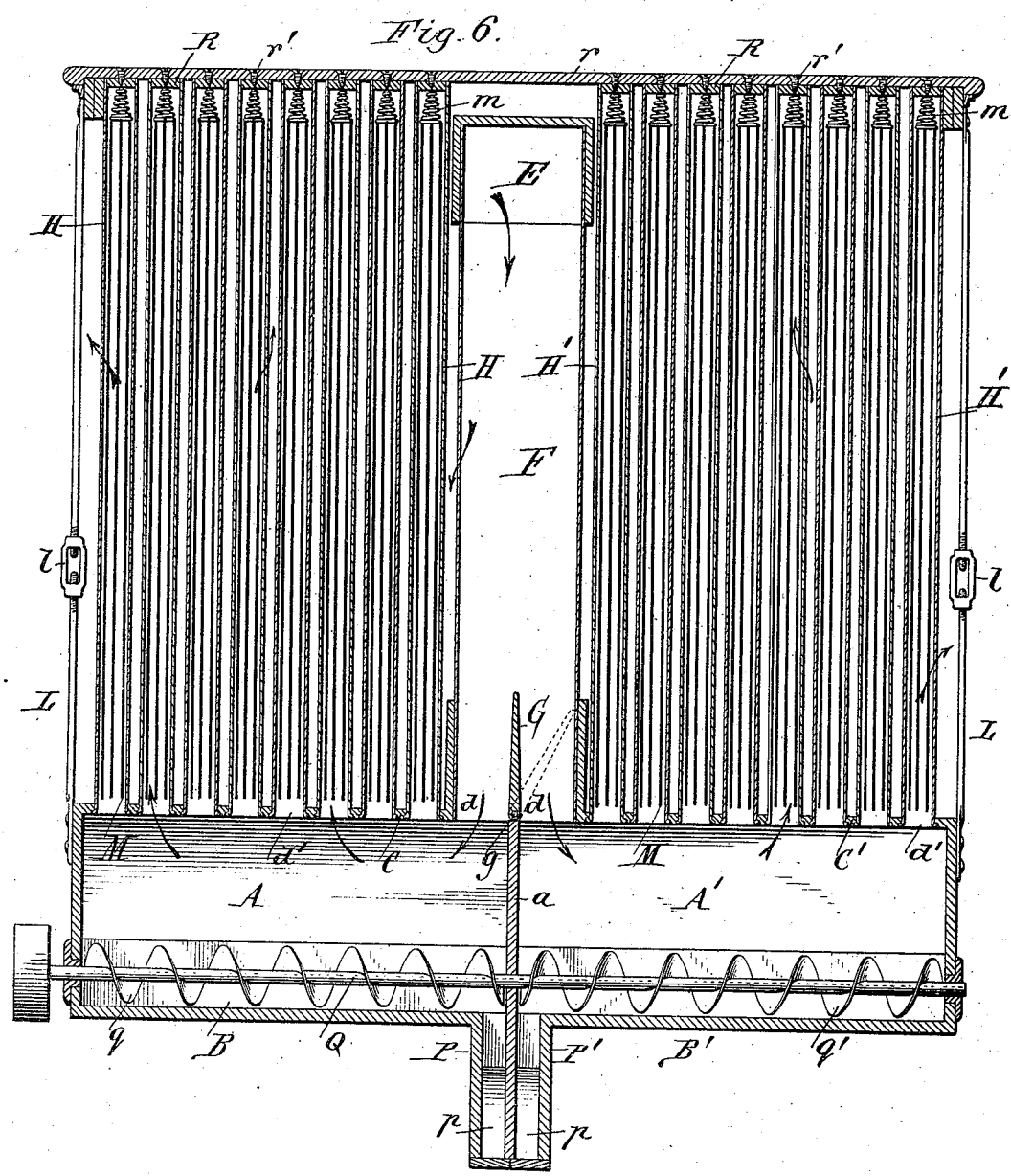

UNITED STATES PATENT OFFICE.

AUGUST HEINE, OF SILVER CREEK, NEW YORK.

DUST-COLLECTOR.

SPECIFICATION forming part of Letters Patent No. 523,652, dated July 24, 1894.

Application filed April 27, 1894. Serial No. 509,282. (No model.)

*To all whom it may concern:*

Be it known that I, AUGUST HEINE, a citizen of the United States, residing at Silver Creek, in the county of Chautauqua and State of New York, have invented a new and useful Improvement in Dust-Collectors, of which the following is a specification.

This invention relates to that class of dust collectors in which the air is filtered or separated from the dust by blowing the dust-laden air into a series of filtering tubes.

My invention has the objects to increase the effectiveness of the machine, to improve the means for securing the filtering tubes in place, to provide simple means for automatically cleaning the tubes and to improve the machine in other respects.

In the accompanying drawings consisting of three sheets:—Figure 1 is a longitudinal sectional elevation of one form of my improved dust collector. Fig. 2 is a horizontal section thereof, in line 2—2, Fig. 1. Fig. 3 is a fragmentary cross section in line 3—3, Fig. 1. Fig. 4 is a fragmentary sectional elevation, on an enlarged scale, of the upper portion of one of the filtering tubes and connecting parts shown in Fig. 1. Fig. 5 is a fragmentary sectional elevation, on an enlarged scale, of the lower portion of one of the filtering tubes and connecting parts. Fig. 6 is a longitudinal sectional elevation showing another form of my improved dust collector. Fig. 7 is a sectional elevation, on an enlarged scale, of the upper portion of one of the filtering tubes and connecting parts shown in Fig. 6.

Like letters of reference refer to like parts in the several figures.

A A' represent two receiving or settling chambers arranged side by side in the base of the machine and separated by a central partition a. The longitudinal sides of these chambers are inclined to form hoppers and their bottoms are provided with conveyer troughs B B', which are arranged in line. The tops of the receiving chambers are closed by manifold heads or decks C C', each of which is provided with an inlet throat d, and a group of circular tube openings d'. The inlet throats of both chambers are arranged on opposite sides of the central partition and the two groups of tube openings are uniformly disposed on opposite sides of the inlet throats.

E represents an inlet chamber arranged transversely above the receiving chamber and provided with a closed top, an open bottom and at both of its ends with inlet spouts e. The open bottom of the inlet chamber is connected with the throats of the receiving chambers by a vertical air passage or expansion chamber F arranged between the two groups of tubes and having its walls preferably constructed of canvas or other filtering material.

G represents a cut off valve arranged in the lower portion of the expansion chamber and adapted to cut off communication between the expansion chamber and either of the receiving chambers. This valve is mounted with its lower end on a transverse rod g, arranged lengthwise above the upper end of the partition a, and is capable of swinging with its free end against either side of the expansion chamber for closing the throat of either of the receiving chambers. The rod g is journaled with its ends in the sides of the receiving chambers and is provided at one end outside of said chambers with a shifting arm g' which is adjustably secured with its free end to the segment by a set screw.

H H' represent two groups of filtering tubes of canvas or other suitable material, arranged vertically above the receiving chambers and communicating at their lower ends with the tube openings of the manifold heads C C', respectively. Each of the filtering tubes is provided at its lower end with a ring h which is somewhat larger in diameter than the tube openings and is secured to the tube in any suitable manner, preferably by lapping or hemming the lower end of the tube around the ring, as shown. The lower end of each tubular opening in the manifold head is provided with an annular enlargement forming a shoulder i. Each filtering tube extends upwardly through a tube opening and the ring at its lower end is seated against the shoulder of the opening. The rings of the tubes are preferably secured against the shoulders of the tube openings by staples i', which are driven into the heads and straddle the rings, as shown in Fig. 5. This means of securing the lower ends of the filtering tubes is very simple and convenient.

J represents a connecting chamber arranged above the inlet chamber and filtering tubes and adapted to connect the upper ends of the two groups of filtering tubes. The top and sides of the connecting chamber are tightly closed, while its bottom is formed by a manifold head $j$, having two groups of tube openings $j'\,j^2$, with which the open upper ends of the filtering tubes H H' connect respectively. The upper ends of the filtering tubes extend through the upper tube openings and are provided with rings $k$, which are fastened against annular shoulders $k'$, arranged in said openings by means of staples $k^2$, in the same manner as the lower ends of the tubes are secured to the manifold heads of the receiving chambers.

The receiving chambers and the connecting chamber are connected by several divided upright rods L, the sections of each rod being connected by a turn buckle $l$, whereby the distance between the receiving chambers and the connecting chamber may be varied to properly tension or stretch the filtering tubes.

M represents whipping or cleaning cords whereby the dust which clings to the inner sides of the tubes is detached. A number of such cords is arranged lengthwise in each of the tubes and the same are secured with their upper ends to a spring $m$ which forms an elastic support therefor. The upper end of the spring is secured to a cross bar $n$ which is secured to the bottom of the connecting chamber. As the dust laden air is blown through the tubes, the whipping cords are tossed around in the tubes whereby the inner sides of the latter are lashed or whipped and the particles of dust adhering thereto are dislodged. The dust so removed drops through the tubes into the conveyer troughs of the receiving chambers.

C represents a cut off valve arranged transversely across the central portion of the connecting chamber and adapted to shut off communication between the upper ends of the two groups of filtering tubes. This valve is mounted centrally upon a transverse rod or shaft, which is journaled in the side walls of the connecting chamber and provided outside of the chamber with an arm for operating it.

P P' represent two discharge spouts which connect with the conveyer troughs and which are preferably arranged adjacent to opposite sides of the partition which separates the receiving chambers. Each of these discharge spouts is provided with a gravity valve $p$.

Q represents a conveyer shaft extending through both conveyer troughs and provided in said troughs with screw conveyers $q\,q'$ which preferably trend in opposite directions, so that both screws convey the material into the central discharge spouts.

When the machine is in operation, the upper cut off valve O is open and the lower cut off valve G is turned to one side, so as to close the inlet throat of one of the receiving chambers, as represented in Fig. 1. The dust laden air which is blown into the receiving chamber passes downwardly through the expansion chamber and a portion of the air escapes through the canvas walls of this chamber, whereby a portion of the dust is separated and deposited on the inner sides of the expansion chamber. The remaining portion of the dust laden air next passes downwardly through the open throat and into the receiving chamber A and thence upwardly into the group of filtering tubes H. The dust laden air, in passing from the expansion chamber into the lower ends of the filtering tubes H, makes an abrupt turn which causes the heavy particles of dust to be separated from the air-current and drop into the conveyer trough B. As the dust laden air passes upwardly through the filtering tubes, a further portion of the air escapes through said tubes and a portion of the dust is deposited on the inner sides of said tubes. The remaining portion of dust-laden air passes out through the upper ends of the tubes H, thence through the connecting chamber, and thence downwardly into and through the other set of filtering tubes whereby the remaining dust is separated from the air and deposited on the inner sides of the tubes H'.

By constantly blowing the dust-laden air through the filtering tubes in one direction, the dust has a tendency to collect in drifts or scales on the inner sides of said tubes. Upon reversing the lower cut off valve G, so as to direct the air current into the other receiving chamber, the dust-laden air passes upwardly through the tubes H' and downwardly through the tubes H, thereby dislodging the dust which has collected in drifts on the tubes.

When it is desired to thoroughly clean the machine, the upper cut off valve O is closed, so as to cut off communication between the upper ends of the two sets of filtering tubes. The lower cut off valve is then shifted to cut off the dust laden air from one set of tubes and these inactive tubes are shaken by hand or otherwise, to dislodge the adhering dust from their inner sides, after which the lower valve is reversed, so as to shut off the current of dust laden air from the other set of tubes to permit the latter to be shaken in like manner. After both sets of tubes have been thoroughly cleaned, the upper valve is again opened to permit the current issuing from the upper end of one set of tubes to enter the upper ends of the other set. By providing the inlet chamber with an inlet spout $e$, at each end, the dust laden air can be conducted into the machine from either or both sides thereof.

In the construction of my improved dust collector, shown in Figs. 6 and 7, the upper ends of both sets of filtering tubes are closed by plugs R, which are fastened in the tubes and secured to the under side of the head or deck $r$, of the machine by screws $r'$. In this construction, the valve G occupies a central position when the machine is in operation, so as to permit the dust laden air to pass into both receiving chambers and enter the lower ends of both sets of filtering tubes, simultaneously. The dust laden air passes through both groups of filtering tubes in an upward direction only, and the cut off valve G is used simply for diverting the air current from one set of tubes, for clearing the same without interrupting the operation of the other set.

I claim as my invention—

1. The combination with a descending expansion chamber having an inlet for the dust laden air at its upper end, of a receiving chamber communicating at its top with the lower end of said expansion chamber and extending laterally on both sides thereof, and two sets of filtering tubes mounted on said receiving chamber on both sides of the expansion chamber and opening with their lower ends into the same, substantially as set forth.

2. The combination with a receiving or settling chamber, of a descending air passage or expansion chamber having its walls constructed of filtering material and opening at its lower end into the receiving chamber, and two sets of filtering tubes opening at their lower ends into the receiving chamber, substantially as set forth.

3. The combination with a receiving or settling chamber, of an air passage or expansion chamber opening at its lower end into the receiving chamber, an inlet chamber having its bottom connected with the upper end of the expansion chamber and provided with inlet spouts at both of its ends, and filtering tubes connected with the receiving chamber, substantially as set forth.

4. The combination with a descending expansion chamber having an inlet for the dust laden air at its upper end, of a divided receiving chamber communicating at its top with the lower end of said expansion chamber and extending laterally on both sides thereof, two sets of filtering tubes mounted on said receiving chamber on both sides of the expansion chamber and opening with their lower ends into the same, and a valve mounted centrally on the divided receiving chamber whereby the dust laden air current can be excluded from either part thereof, substantially as set forth.

5. The combination with two receiving or settling chambers, of an air passage or expansion chamber adapted to communicate with either of said chambers, two sets of open ended filtering tubes, the tubes of each set opening into one of said receiving chambers, and a connecting chamber communicating with the open upper ends of both sets of filtering tubes, substantially as set forth.

6. The combination with two receiving or settling chambers of an air passage or expansion chamber having a valve for placing said air passage in communication with either of said chambers, two sets of filtering tubes, open at both ends, the tubes of each set communicating at their lower ends with one of said chambers, a connecting chamber whereby the upper ends of both sets of tubes are placed in communication and a valve arranged in said connecting chamber and adapted to cut off communication between the upper ends of the two sets of tubes, substantially as set forth.

7. The combination with a receiving or settling chamber, of a filtering tube connected with said chamber and a whipping or cleaning cord loosely supported within said tube, substantially as set forth.

8. The combination with a receiving or settling chamber of a filtering tube connected with said chamber, whipping cords arranged loosely in said tubes, and springs supporting said cords, substantially as set forth.

Witness my hand this 12th day of April, 1894.

AUGUST HEINE.

Witnesses:
 JNO. J. BONNER,
 THEO. L. POPP.